(No Model.)

S. RIGHTMYER.
Bit Brace.

No. 235,380. Patented Dec. 14, 1880.

Witnesses:
Hugh Sangster,
A. J. Sangster.

Inventor:
Sherwood Rightmyer.
By James Sangster,
Atty.

UNITED STATES PATENT OFFICE.

SHERWOOD RIGHTMYER, OF BUFFALO, NEW YORK.

BIT-BRACE.

SPECIFICATION forming part of Letters Patent No. 235,380, dated December 14, 1880.

Application filed April 24, 1880. (No model.)

*To all whom it may concern:*

Be it known that I, SHERWOOD RIGHTMYER, a citizen of the United States, residing in the city of Buffalo, in the county of Erie and State of New York, have invented certain new and useful Improvements in Bit-Braces, of which the following is a specification.

The object of my invention is to provide the means in a bit-brace whereby either a round, square, or other bit-shank may be readily inserted and fastened securely in place, or as easily removed when required; and it consists of a brace provided with two jaws pivoted at a suitable point between the ends, and formed so as to constitute an adjustable bit-socket, the arrangement being such that when a bit is inserted and pressed down between them the bottom of the jaws are forced out away from each other, and the top ends in toward each other, thereby adjusting the jaws to the top and bottom of the bit-shank, the jaws being kept open by a spring, as will be more clearly hereinafter shown by reference to the drawings, in which—

Figure 1:
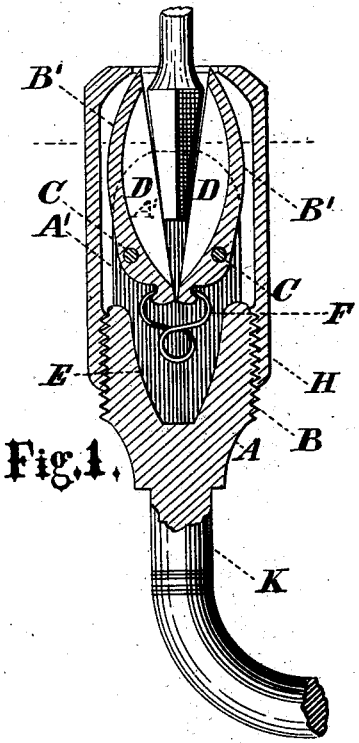
Figure 2:
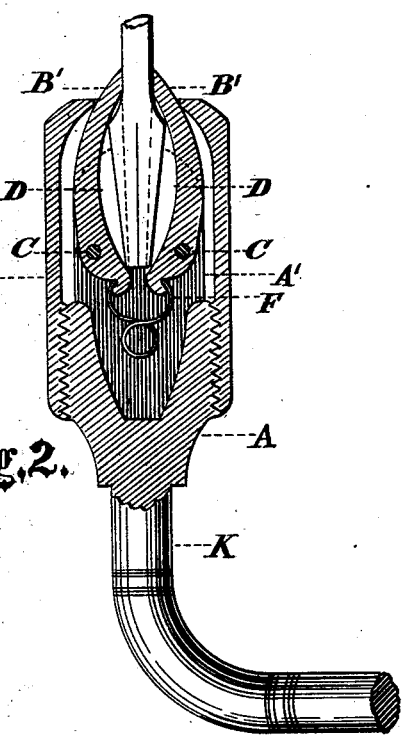
Figure 3:
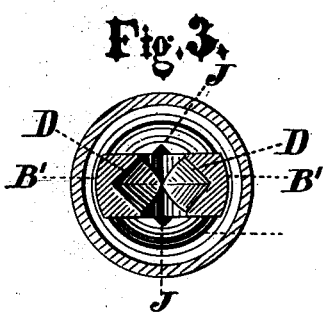

Figure 1 is a vertical central section through the bit-holder, showing the jaws open in position to receive a bit. Fig. 2 represents a similar section, showing the jaws closed and fastened in position for holding a bit; and Fig. 3 is a horizontal section of Fig. 1, showing a cross-section through the depressions in the face of the jaws forming the bit-socket.

A is the brace-head or bit-holder, provided with a screw, B, and the two jaws B', pivoted at C. The jaws are each provided with a depression, D, which is angular in cross-section, (see Fig. 3,) so as to receive the corners of the bit-shank, (when it is a square one,) and of any suitable curve in longitudinal section— for instance, as shown in Figs. 1 and 2—so as to form an adjustable socket for a bit-shank, as before mentioned.

The brace-head A is provided with two sides, A', between which the jaws B' are inserted and pivoted. Below the jaws is a socket or cavity, E, large enough for the spring F, which forces the lower ends of the jaws together and the upper ends apart when left free to act, as shown in Fig. 1. The jaws can be used without the spring F, if required; but they operate more conveniently with it, as they open automatically when the nut or screw-sleeve H is turned up.

The sides A' of the brace-head are each provided with an angular groove, J, when necessary, so as to leave room to receive a larger bit-shank than the width of the jaws will permit. (See Fig. 3.)

The operation will be readily understood by reference to Figs. 1 and 2—Fig. 1 showing the sleeve or nut H screwed up, so that the jaws are open to receive the bit-shank, and Fig. 2 showing it screwed down, so as to hold the jaws in place and the bit secure.

K represents a portion of the ordinary and well-known bit-brace.

I claim as my invention—

1. In a bit-brace, the combination of the holder A, having sides A', the jaws B' B', pivoted by transverse pivots C C between their opposite ends to said sides, spring F, and sleeve H, adjustable vertically on said holder, all as set forth.

2. In a bit-brace, the combination of the bit-holder, having sides A' and cavity E, as shown, the sleeve A, adapted to be screwed onto said bit-holder, the jaws pivoted by transverse pivots C, and the spring F, clasping the ends of the jaws and extending into the cavity E below the jaws, whereby the bit may be forced past the inner ends of the jaws, substantially as set forth.

SHERWOOD RIGHTMYER.

Witnesses:
JAMES SANGSTER,
A. J. SANGSTER.